Aug. 18, 1964   J. H. CARPENTER   3,144,929
BELT CONVEYOR
Filed May 25, 1961   8 Sheets-Sheet 2
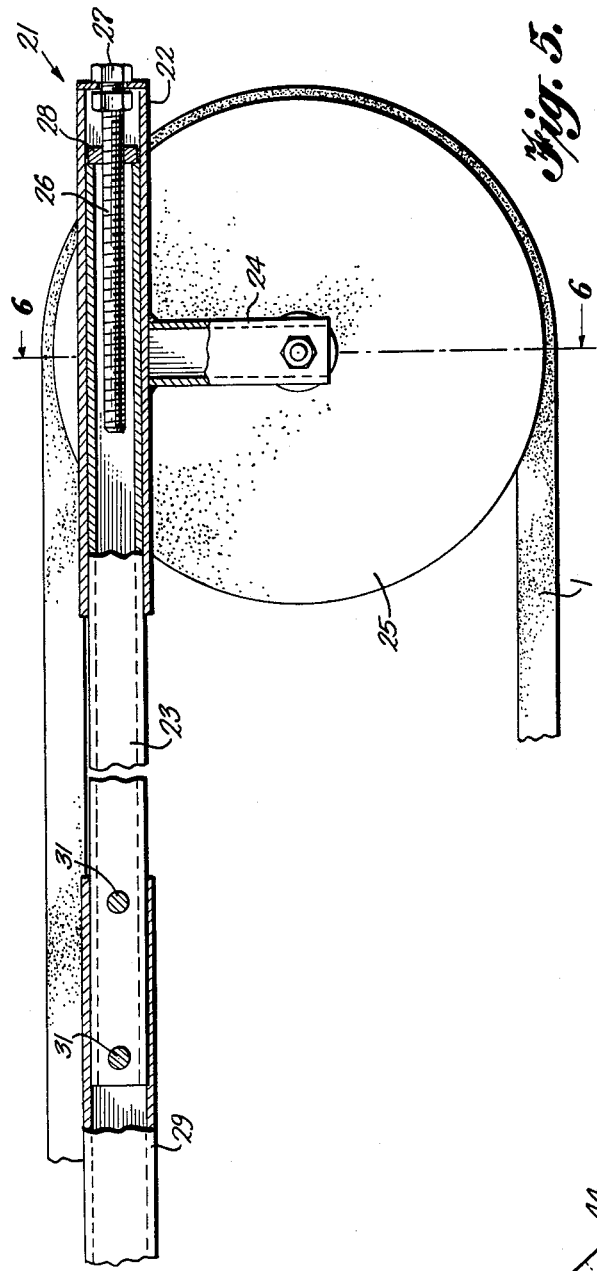
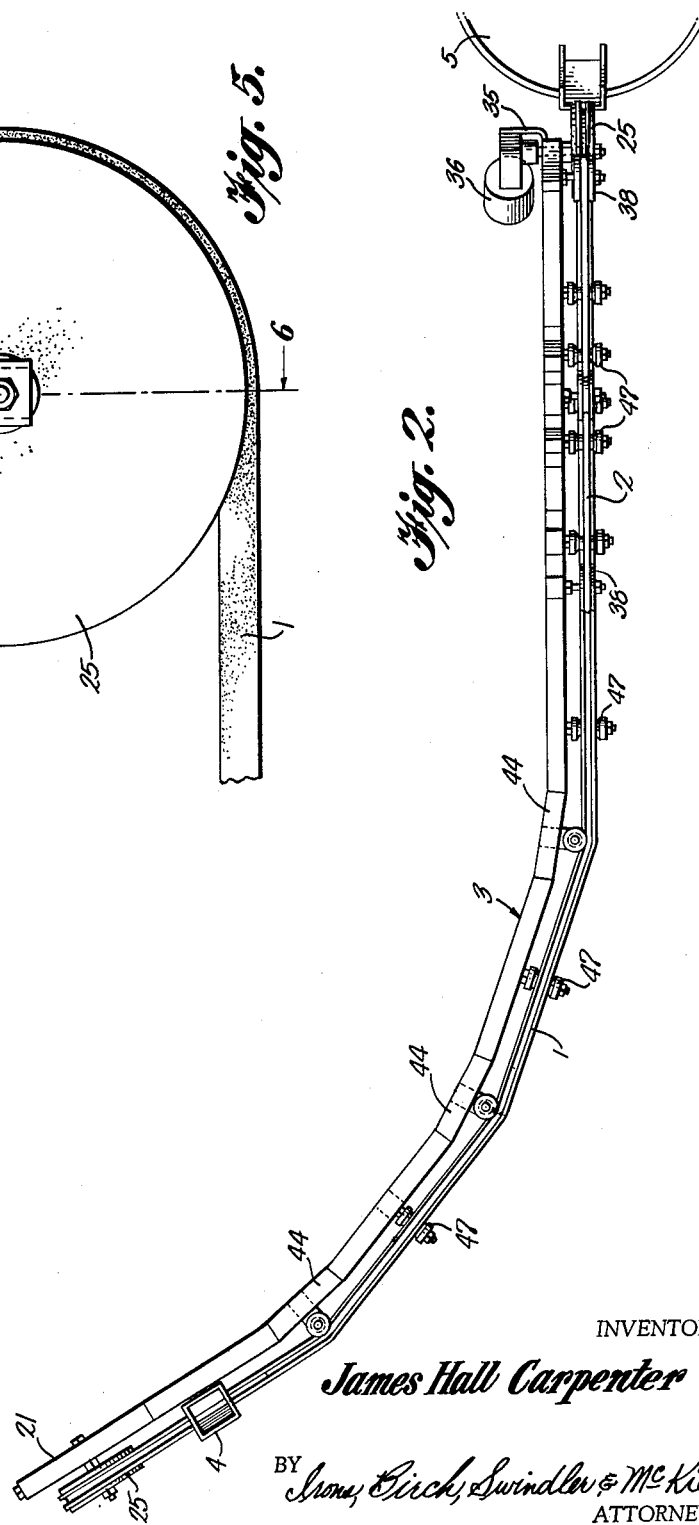
INVENTOR
James Hall Carpenter
BY Jones, Birch, Swindler & McKie
ATTORNEYS Aug. 18, 1964 J. H. CARPENTER 3,144,929
BELT CONVEYOR
Filed May 25, 1961 8 Sheets-Sheet 3
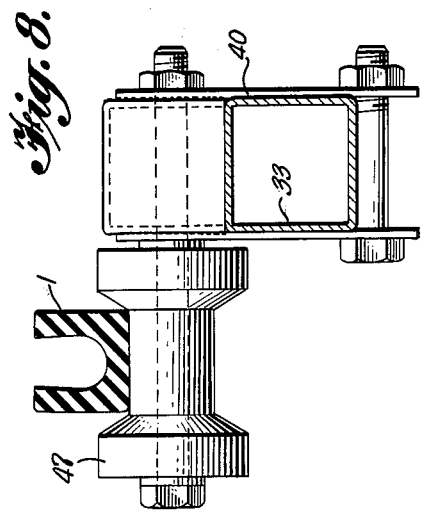
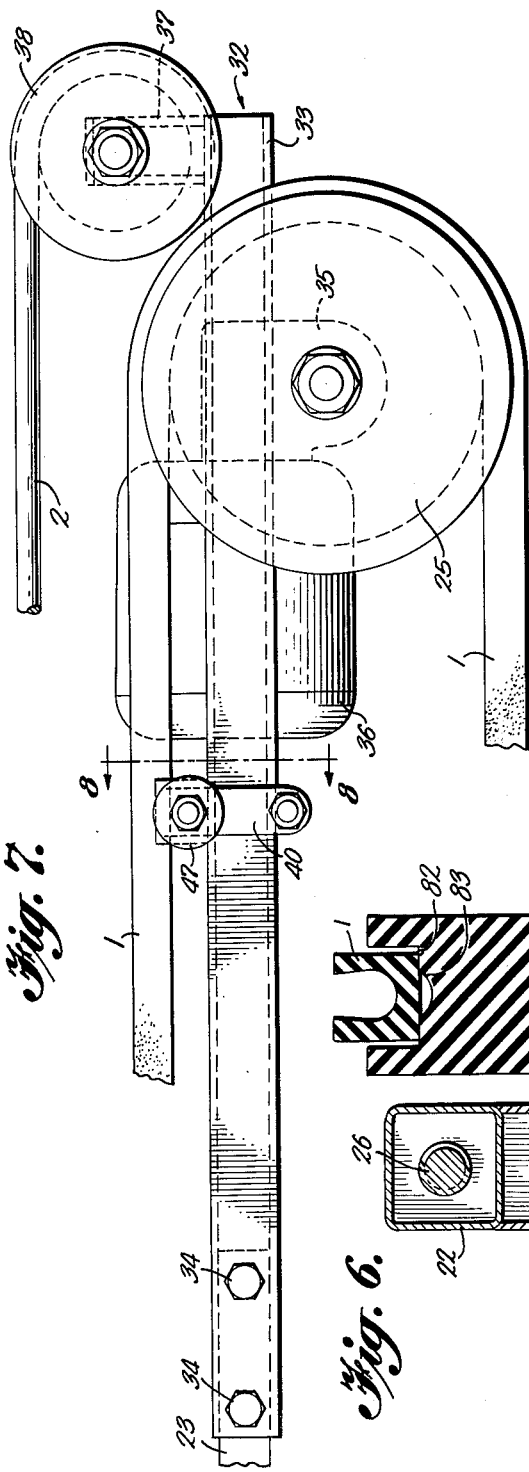
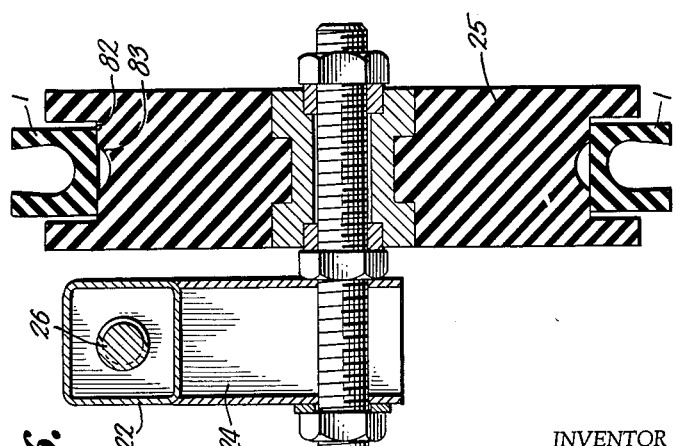
INVENTOR
*James Hall Carpenter*
BY *Irons, Birch, Swindler & McKie*
ATTORNEYS Aug. 18, 1964    J. H. CARPENTER    3,144,929
BELT CONVEYOR
Filed May 25, 1961    8 Sheets-Sheet 4
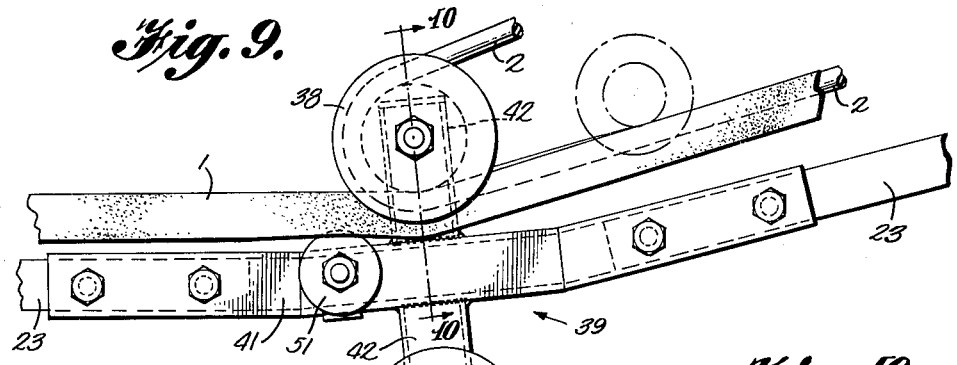
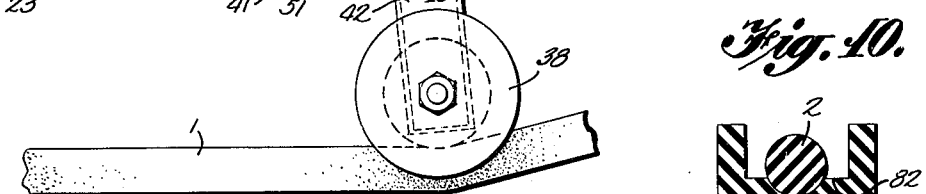
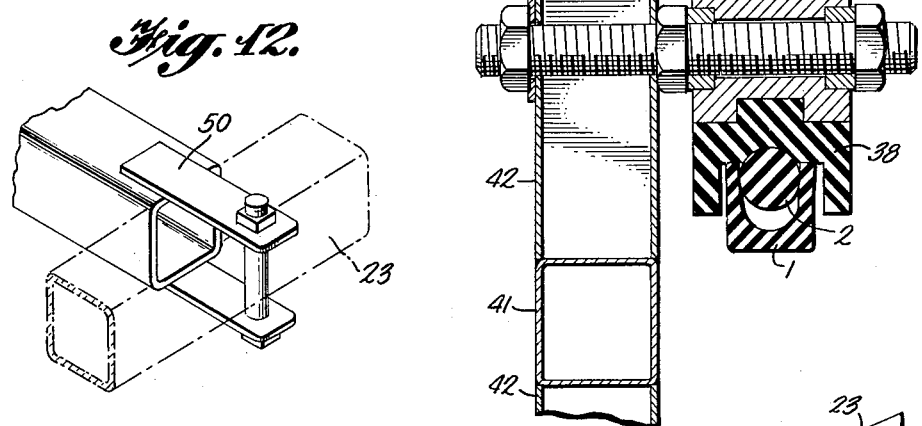
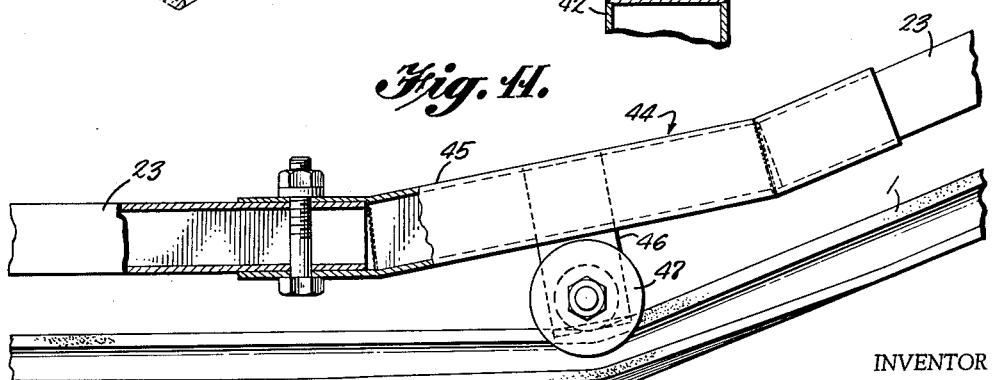
INVENTOR
*James Hall Carpenter*
BY *Irons, Birch, Swindler & McKie*
ATTORNEYS Aug. 18, 1964         J. H. CARPENTER         3,144,929
                        BELT CONVEYOR
Filed May 25, 1961                          8 Sheets-Sheet 5
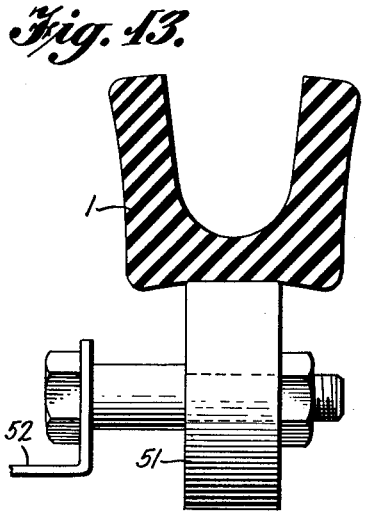
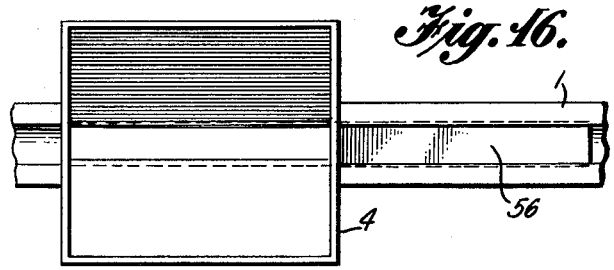
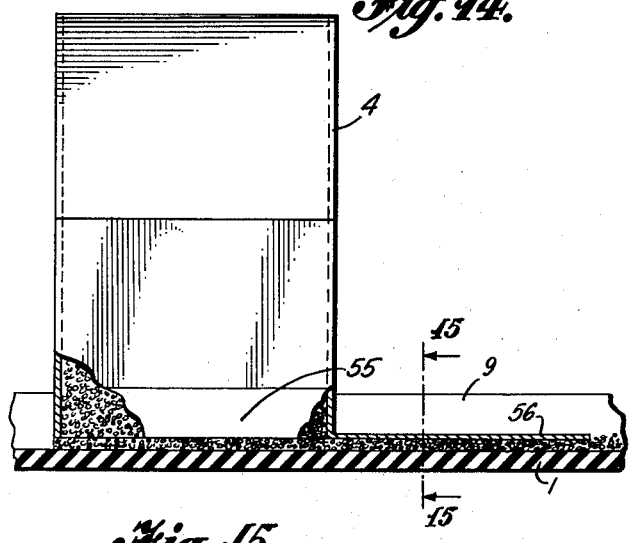
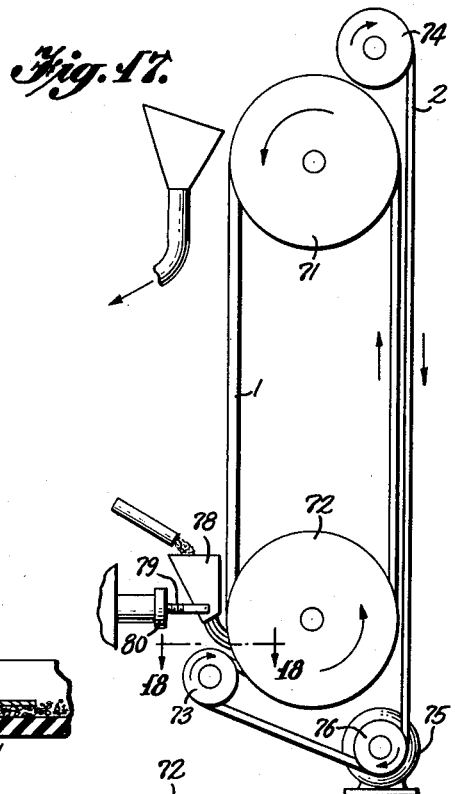
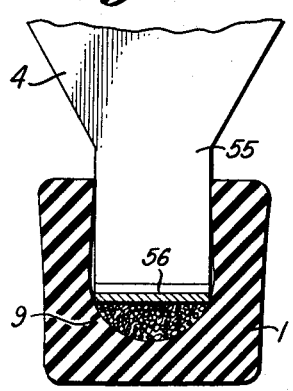
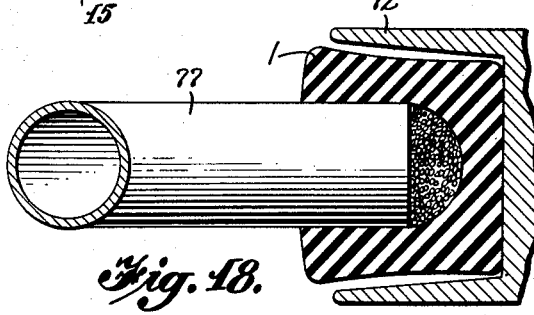
INVENTOR
James Hall Carpenter
BY
Irons, Birch, Swindler & McKie
ATTORNEYS Aug. 18, 1964  J. H. CARPENTER  3,144,929
BELT CONVEYOR
Filed May 25, 1961  8 Sheets-Sheet 6
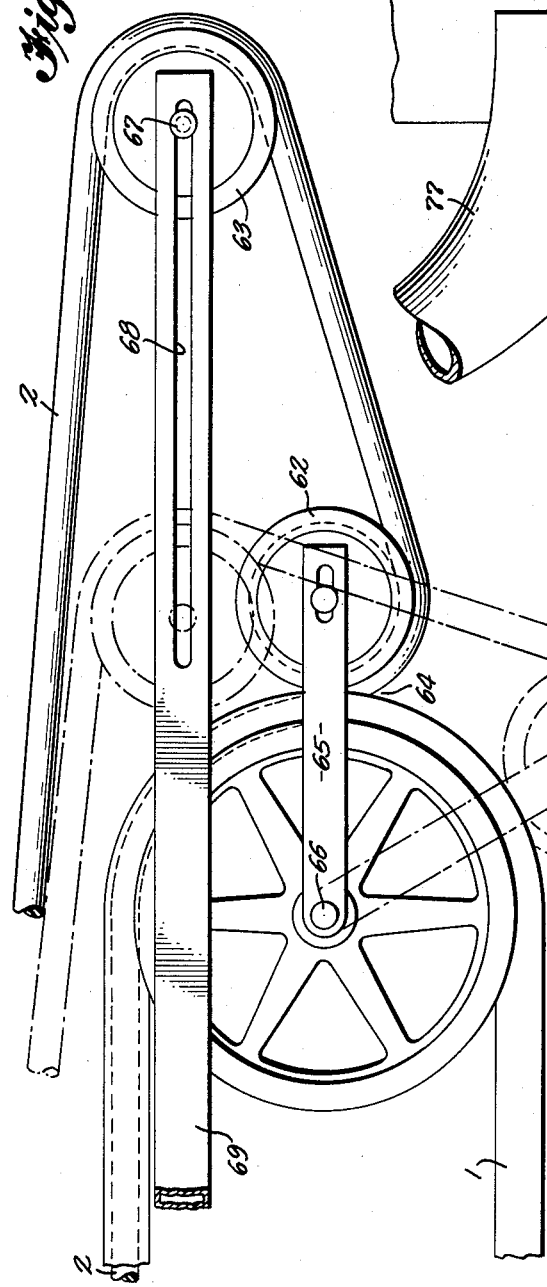
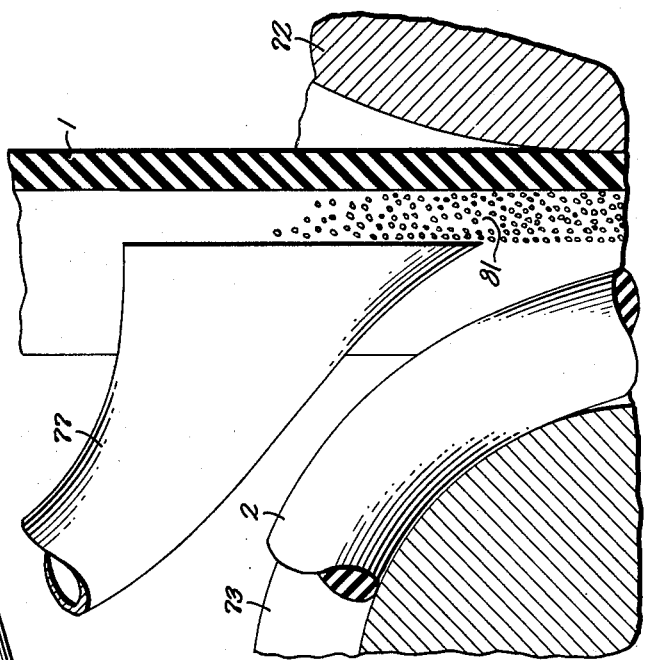
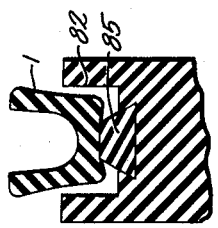
INVENTOR
James Hall Carpenter
BY Irons, Birch, Swindler & McKie
ATTORNEYS Aug. 18, 1964  J. H. CARPENTER  3,144,929
BELT CONVEYOR Filed May 25, 1961  8 Sheets-Sheet 7

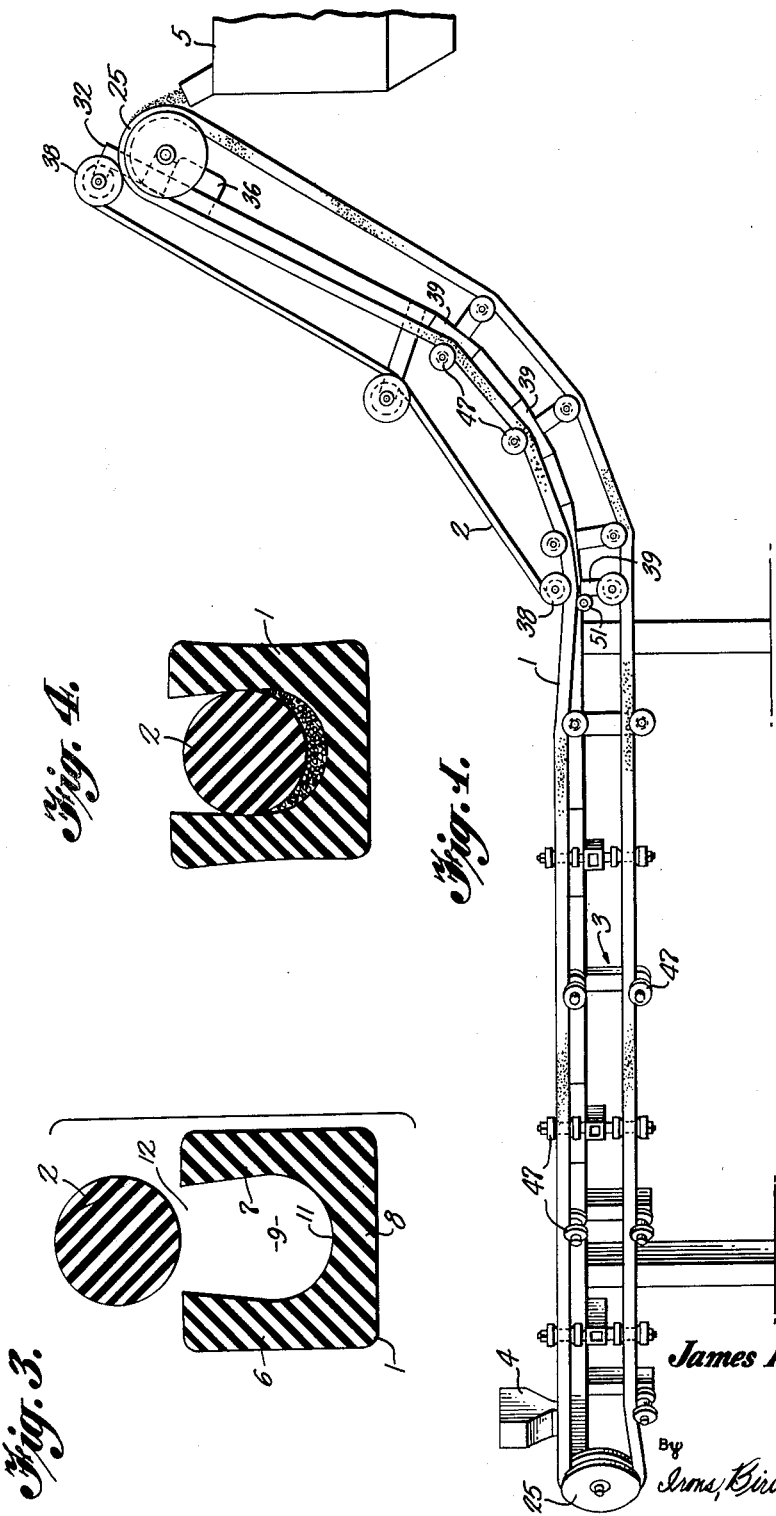

INVENTOR
James Hall Carpenter

BY Irons, Birch, Swindler & McKie
ATTORNEYS

Aug. 18, 1964  J. H. CARPENTER  3,144,929
BELT CONVEYOR
Filed May 25, 1961  8 Sheets-Sheet 8

INVENTOR
James Hall Carpenter

BY Irons, Birch, Swindler & McKie
ATTORNEYS

United States Patent Office 3,144,929
Patented Aug. 18, 1964

3,144,929
BELT CONVEYOR
James Hall Carpenter, Jacksonville, Fla., assignor to Carpco Research & Engineering, Inc., Jacksonville, Fla., a corporation of Florida
Filed May 25, 1961, Ser. No. 112,580
19 Claims. (Cl. 198—165)

This invention relates to conveyors and more particularly to conveyors for fluent material.

The transportation of fluent materials such as particulate solids, slurries and liquids presents a variety of problems. In many plants large quantities of fluent materials must be conveyed from one location to another rapidly and in a continuous stream or streams. Frequently the material must be moved around corners and between different levels. In some operations it is desirable that the temperature of the material be maintained at a nonambient level during transportation. Moreover, certain materials are easily damaged by conventional conveying equipment or cause damage to such equipment.

One example of a field attended by such requirements for conveying fluent materials is that of ore beneficiation. Conventionally, mineral ores are crushed to a finely divided particulate form to liberate different components. Depending upon the characteristics of the various components, they are separated by one or more of a variety of processes. For example, mineral components of different electrical properties may be separated by an electrostatic operation. In such processes, the crushed ore must be transported to the beneficiating apparatus. After treatment, the concentrate and gangue are conveyed to different locations. Middlings may be separately collected and recycled. The transportation of the various categories of the particulate minerals follows both horizontal and vertical paths and should be rapid and continuous. The particles should be conveyed with minimum grinding into smaller sizes or other physical damage to the particles or to the conveying equipment. In some operations the minerals must be fed hot to a separating machine or even maintained hot through several such machines.

A great variety of conveying devices have been evolved in an attempt to meet such varied requirements as those described. Bucket elevators have been employed but are characterized by serious disadvantages. In general, such systems are noisy, expensive and subject to rapid wear where abrasive materials are transported. The feeding and discharge of the buckets is intermittent rather than continuous. It is difficult to provide cover for the material being transported in the buckets to minimize spilling or temperature change. Bucket systems having both horizontal and vertical runs are particularly difficult to construct.

Screw conveyors are attended by many of the same disadvantages as bucket elevators including high cost, rapid wearing of the parts and low capacity. Moreover, a screw conveyor is essentially a straight line conveyor and does not fulfill the requirement for transportation around both horizontal and vertical curves.

Pneumatic conveyors in which particles are transported in a high-speed current of air are bulky and expensive, have high power requirements, and require separation of the solids from the air prior to delivery. The great quantities of air which are necessary require complex pumping equipment. Moreover, if the particles are to be maintained at an elevated temperature the air must be heated which is an expensive procedure.

Conventional conveyor belts do not lend themselves to high-speed operation particularly where curves and inclines must be negotiated. The material tends to slide downwardly along the belt when conveyed uphill and to be thrown outwardly by centrifugal force when carried around horizontal curves. Attempts have been made to provide multi-part conveyor belts which provide a closed chamber for the fluent material being conveyed. Heretofore available conveyors of this type have not proved satisfactory in use. Some prior art devices of such character have provided a cover for a wide trough-shaped belt in an attempt to eliminate some of the difficulties. In such devices, however, the cover has been attached in such a manner as to fix the capacity of the trough. Thus the trough must be completely filled with the fluent material to be conveyed in order to prevent downhill migration of the material on vertical or inclined runs. Moreover, heretofore available prior art devices have been characterized by complex connections between the conveyor trough and the covers thus making them so expensive and cumbersome to operate as to severely limit their commercial utility. Still further they have not lent themselves to operation around horizontal curves.

To overcome the disadvantages of the prior art, it is a general object of this invention to provide an improved conveyor for fluent materials.

A further object of the invention is to provide such a conveyor capable of continuous high-speed operation.

Another object of the invention is to provide such a conveyor wherein fluent material may be transported around horizontal curves and along uphill runs without loss of the material or without migration thereof in a downhill direction.

It is still another object of the invention to provide such a conveyor which is inexpensive to construct, operate and maintain, having a minimum of component parts, low power requirements, and which operates with little friction.

Yet another object of the invention is to provide such a conveyor which maintains the material being transported at a nonambient temperature.

A still further object of the invention is to provide a high-speed continuous belt conveyor with a demountable supporting structure which is simple, easy to construct and is capable of assembly in a variety of configurations using standard parts.

Broadly, the invention relates to a belt conveyor for a fluent material which in combination comprises first and second belt means, each of said belt means being horizontally and vertically flexible and at least one of said belt means being resilient, said first belt means having continuous bottom and side walls impervious to the fluent material and defining a continuous longitudinal trough, said second belt means being slightly wider than the outer portion of said trough and movable inwardly in said trough in frictional gripping relation between said side walls to press the fluent material between the bottom of said second belt means and the bottom of said trough.

While the second belt means or insert is particularly desirable for uphill or downhill runs, it may be omitted when the travel is substantially horizontal. In negotiating horizontal curves, the trough-shaped first belt means, which preferably is substantially equal in width and depth, has a roller engaging its radially inner side at the horizontal curve to cause the tops of the sidewalls of the belt to converge at the roller to minimize egress of the fluent material being conveyed from the trough due to centrifugal force.

An especially preferred embodiment of the invention comprises in a belt conveyor, a first priable conveyor belt means formed with a continuous longitudinal trough therein, said trough providing a material supporting surface, said trough defining at least one wall sloping inwardly and toward the center of said trough to provide a camming surface, a second priable belt means providing a material pressing surface and a portion engaged with said camming surface during conveying of material pressed between said pressing and supporting surfaces, at least one of said belt means being resilient, means for locating said second belt means in said trough to engage said camming surface with said portion of said second belt means, said inwardly sloping camming surface cooperating with said portion of said second belt means to continuously urge said pressing surface toward material supporting contact with said supporting surface during conveying of material.

The invention having been generally described, various specific embodiments thereof will now be described in more detail with reference to the accompanying drawings in which:

FIGURE 1 is a side elevational view of a conveyor system in accordance with a preferred embodiment of the invention;

FIGURE 2 is a top plan view of the conveyor system shown in FIGURE 1;

FIGURE 3 is an enlarged section of a U-shaped belt and an insert belt constructed in accordance with the preferred embodiment of the invention shown in disassembled relation;

FIGURE 4 is a view similar to FIGURE 2 showing the belts operatively engaged in material conveying relation;

FIGURE 5 is a fragmentary detail partially in section of one end of the supporting structure for the conveyor system shown in FIGURES 1 and 2;

FIGURE 6 is a vertical section taken along the line 6—6 of FIGURE 5;

FIGURE 7 is a fragmentary detail of the other end of the supporting structure for such conveyor system;

FIGURE 8 is a vertical section taken along the line 8—8 of FIGURE 7;

FIGURE 9 is a fragmentary detail showing an intermediate component of the supporting structure for such conveyor system to change the vertical direction of the conveyor belt;

FIGURE 10 is a sectional view taken along the line 10—10 of FIGURE 9;

FIGURE 11 is a fragmentary detail showing another intermediate component of the supporting structure for such conveyor system to change the horizontal direction of the conveyor belt;

FIGURE 12 is a fragmentary perspective of one of the mounting brackets employed in the supporting structure for such conveyor system;

FIGURE 13 is an enlarged fragmentary detail of a roller employed in such conveyor system to spread the U-shaped belt to facilitate insertion of the insert belt;

FIGURE 14 is an enlarged fragmentary detail showing a feed hopper employed in such conveyor system;

FIGURE 15 is a vertical section taken along the lines 15—15 of FIGURE 14;

FIGURE 16 is a top plan view of the feed hopper shown in FIGURE 14;

FIGURE 17 is a side elevational view of a modified conveyor system according to the invention employed as an elevator;

FIGURE 18 is a horizontal section taken along the line 18—18 of FIGURE 17;

FIGURE 19 is an enlarged fragmentary detail of the feeding nozzle employed in the system illustrated in FIGURE 17;

FIGURE 20 is a fragmentary detail of a discharge station which may be employed in a conveyor system according to the invention to control the direction of discharge of fluent material from the conveyor;

FIGURE 21 is a fragmentary sectional view of a modiged form of pulley which may be employed in a conveyor system according to the invention;

FIGURE 22 is a fragmentary sectional view of another modified form of pulley which may be employed in a conveyor system according to the invention illustrating the use of such pulley to spread the U-shaped belt;

Figure 34:
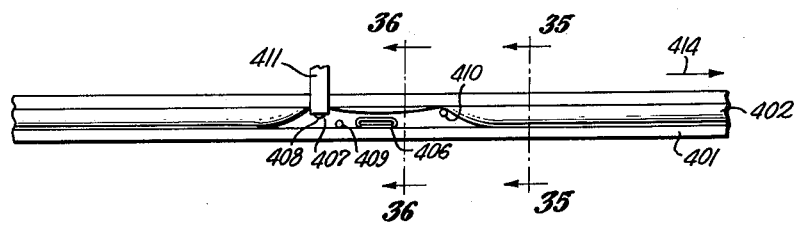
Figure 35:
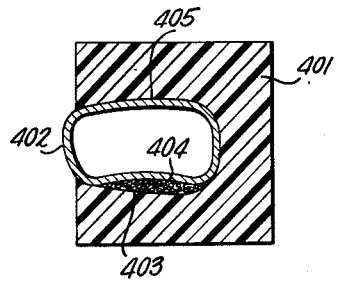
Figure 36:
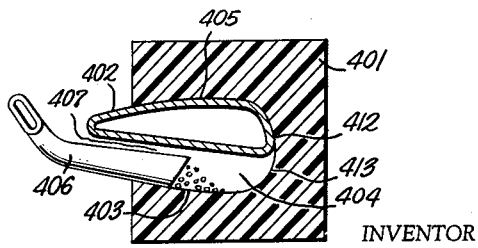

FIGURE 34 is a fragmentary side elevation of a conveyor system embodying belts in accordance with another modification of the invention; and FIGURES 35 and 36 are enlarged sectional views taken along the lines 35—35 and 36—36 respectively of FIGURE 34 and showing details of the belt assembly in accordance with said further modification.

The conveying system illustrated in FIGURES 1 and 2 comprises a pair of cooperating belts 1 and 2 supported by a frame 3 to receive materials from a feed hopper 4 and deliver them to a receiving hopper 5. The belt 1 has a U-shaped cross section and follows an endless path from the hopper 4 around a horizontal curve as shown in FIGURE 2 and then up a vertical incline as shown in FIGURE 1. At the point of highest elevation above the hopper 5, the belt 1 reverses in direction and travels along a lower run parallel to its upper run back to the feed hopper 4. The belt 2 follows an endless path which coincides with the path of the belt 1 only during the vertically inclined portion of the latter as shown in FIGURE 1. The belt 2 is inserted in the trough defined by the U-shaped belt 1 during the coinciding portion of their paths.

The U-shaped belt 1, as shown in FIGURE 3, has continuous sidewalls 6 and 7 and a continuous bottom 8 which define a trough 9 providing a material supporting surface. Preferably the inner surface of the sidewalls 6 and 7 incline or slope inwardly from the trough bottom 11 toward the center of the trough mouth 12. The continuous sidewalls and bottom of the belt 1 render the trough impervious to fluent material. The trough bottom is preferably rounded to approximately semicircular shape as shown in FIGURE 3. The diameter of the belt 2 may be greater than or substantially equal to the diameter of the trough 9. Because of the inwardly sloping configuration of the sidewalls of the belt 1, the width of the upper portion of the trough above the point of maximum width is less than the diameter of the belt 2. At least one of the belts is formed of a material of sufficient resilience and pliability to permit the belt 2 to be inserted into the trough 9 generally into the position shown in FIGURE 4 where it is held and urged toward the bottom of the trough 9 by the action of the inwardly inclined or sloping walls 6 and 7 which provide camming surfaces cooperating with portions of the belt 2. Thus the belts 1 and 2, when in material conveying relation transporting fluent material such as particulate ore as shown in FIGURE 4, press the fluent material between the bottom surface of the belt 2 and the bottom 11 of the trough 9. Although the sloping or inclined walls of the trough are preferred, satisfactory results can be obtained by making the belt 2 wider than the trough 9 or at least wider than the upper portion of the trough 9 through which the belt 2 moves. Thus when the belt 2 is inserted in the trough 9 it is frictionally held by the narrower trough walls and can be pressed toward the bottom of the trough until it firmly contacts and presses against material in the trough 9 thereby pinching and firmly holding such material.

Preferably both the U-shaped belt 1 and the insert belt 2 are formed of a highly resilient material. Particularly preferred is a rubbery material such as natural or synthetic rubber or other plastic material having the general characteristics of rubber. The use of rubbery material permits friable materials to be conveyed with minimum damage thereto and harder abrasive materials to be conveyed with minimum damage to the belts. For conveying particularly fragile materials, the bottom of the trough 9 may be lined with a soft material such as sponge rubber. Somewhat harder or smoother surfaced rubber may be more desirable for conveying highly abrasive particles such as ground glass or the like.

The belts may be slightly elastic or stretchable in length, but it is preferred that stretching should not exceed one or two percent and for most constructions stretching by more than a small fraction of one percent is undesirable.

Due to the pressing action between the assembled belts 1 and 2, particulate material is held firmly. The assembled belts may convey material uphill or downhill and along various vertical or horizontal curves with the trough of the belt 1 upright or inverted without danger of spilling of the material or migration thereof longitudinally of the belt due to inertia or gravity. The assembled belts are particularly advantageous along paths having a vertical component because they hold the material against downhill sliding.

As shown in FIGURE 4, the insert belt 2 travels at approximately the average radius of the U-shaped belt as the assembled belts move around horizontal or vertical curves, or stated differently the axes of flexure of the two belts approximately coincide, and this arrangement has the advantage that there is little relative longitudinal movement of the mutually engaged walls of the two belts as they pass around pulleys or otherwise change direction. Indeed, because of the rubbery material which is longitudinally stretchable, the two belts may deform together when negotiating a curve even though their axes of flexure may not precisely coincide. Thus there is little wear of the belt due to friction and no opening of gaps to spill material even on curves.

In the conveying system shown in FIGURES 1 and 2 the belts are supported by a plurality of pulleys carried by the frame 3. The frame 3 is comprised of a plurality of components which are easily mountable and demountable. Using the same supporting components, an infinite number of different belt paths may be constructed.

Specifically, the frame 3 is made up of a plurality of telescoping sections. One of the end sections 21 of the frame is shown in detail in FIGURE 5. The end section 21 comprises a sleeve 22 which is telescopically engaged with an elongated hollow bar 23. Extending transversely of the sleeve 22 and welded thereto is a pulley mounting bracket 24 on which a pulley wheel 25 is rotatably mounted. The sleeve 22 may be longitudinally adjusted relative to the bar 23 to move the pulley wheel 25 and thus control the tension on the belt 1. Such adjustment is effected by a threaded bolt 26 which is rotatably mounted in the end of the sleeve 22 but fixed against axial movement relative thereto. The bolt 26 may be rotated by a head 27 positioned outside of the end of the sleeve. The bolt 26 is threadedly received in a cap 28 which is fixed to the end of the bar 23. Thus upon rotation of the bolt 26 the sleeve 22 is caused to travel longitudinally relative to the bar 23. The bar 23 is removably connected to the next intermediate sleeve 29 as by bolts 31.

The other end section 32 of the frame 3 is shown in FIGURE 7 and comprises a sleeve 33 which telescopically engages a connecting longitudinal bar 23 and is removably connected thereto as by bolts 34. The sleeve 33 has welded thereto a bracket 35 to which is rotatably connected a pulley wheel 25 which constitutes a drive wheel powered by a motor 36 which is also connected to the bracket 35 and may be electrically operated. Welded to the extreme end of the sleeve 33 is a bracket 37 to which is rotatably connected a sheave 38 for the insert belt 2. Th sheave 38 opposes the wheel 25 and the belts travel around them in opposite directions to remove the insert belt 2 from the U-shaped belt. As shown in FIGURE 8, a guide spool 47 is attached to the sleeve 33 by a removable collar 40 in position to support and guide the belt 1.

With reference to FIGURES 1 and 9, the opposite end of the belt 2 passes around an identical sheave 38 which is connected to an angular intermediate section 39 of the frame 3. The intermediate section 39 comprises a bent sleeve 41 the ends of which are vertically inclined with respect to each other. Such ends are removably connected as by bolting to intermediate bars 23. A pair of oppositely disposed sheaves 38 are connected to the sleeve 41 through brackets 42 on each of which a sheave is rotatably mounted and which in turn are welded to the sleeve 41. Another function of the upper sheave 38, as shown in FIGURES 9 and 10, is to guide the belt 1 and change its direction from a horizontal run to an inclined run. The lower sheave 38 guides the lower run of the belt in the same manner. As shown in FIGURE 1, a plurality of intermediate sections 39 are provided at spaced locations to gradually change the direction of the belt travel from horizontal to steeply inclined.

Mounted along the horizontal curve of the belt 1, as shown in FIGURE 2, are a plurality of intermediate sections 44 of the frame 3. One such section 44 is shown in detail in FIGURE 11 and comprises a horizontally bent sleeve 45 which is removably connected as by bolting at its outer ends to elongated bars 23. Connected to the radial exterior of the sleeve 45 is a bracket 46 to which is rotatably connected a guide spool 47 which directs the belt 1 around the horizontal curve. As shown in FIGURE 11, during the horizontal portion of its travel the belt 1 has no insert belt 2. Thus, the fluent material which is carried in the trough has no cover and as the belt negotiates the horizontal curve, there is a tendency for the material to be thrown outwardly by centrifugal force. The effect of the centrifugal force is at least in part compensated for by the pressure of the guide spool 47 against the side of the belt 1 which causes the upper ends of the sidewalls of the belt 1 to converge. Such convergence tends to retain the fluent material against spilling over the top of the trough due to centrifugal force.

As many guide spools for the belts 1 and 2 as desired may be mounted at spaced locations along the frame 3 to keep the belts in their desired paths. Such spools may be connected either to the sleeves or to the bars 23.

Various combinations of frame components such as end sections 21 and 32, intermediate sections 39 and 44, and connecting bars 23 may be employed to construct a conveyor system to follow any desired path. These components are demountable and may be removably connected to supporting standards by means such as the yoke 50 shown in FIGURE 12.

In the system shown in FIGURES 1 and 2, the insert belt 2 is employed only during the uphill portion of the travel of the belt 1. As the belt 1 reaches the first vertically bent intermediate section 39 and passes around the lower portion of the sheave 38 the insert belt 2 passes around the upper portion of the sheave 38 and back around the under side of the same sheave and is thus inserted in the trough of the belt 2. Desirably the ends of the trough are spread to permit the insertion of the belt 2 with minimum frictional contact with the inner walls of the trough. To this end, as illustrated in FIGURES 9 and 13, a trough opening roller 51 is mounted immediately ahead of the sheave 38. The roller 51 is rotatably connected to a bracket 52 which in turn is carried by the sleeve 41 in such a position as to force the top of the roller 51 vertically upwardly into the bottom of the belt 1. Such pressure of the roller against the bottom center of the belt 1 causes the mouth of the trough to be spread, as shown in FIGURE 13, preferably to a width in excess of the diameter of insert belt 2 to permit the latter to enter the trough without contacting the sidewalls of the belt 1. The insert belt 2 can be forced into the belt 1 without spreading the trough but the resulting friction increases the wear of both belts thereby shortening their life.

Figure 24:
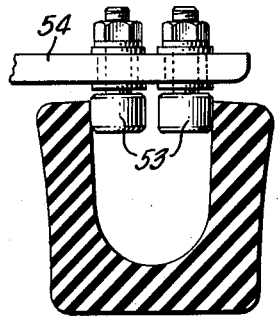
FIGURE 24 is a fragmentary sectional view of a further modified apparatus for spreading the ends of the trough of the U-shaped belt.

An alternative spreader construction is shown in FIGURE 24 in the form of a pair of spaced rollers 53 mounted on a vertical axis to a bracket 54 suitably attached to the frame 3. The rollers 53 descend into the trough and their exterior sides are spaced apart the distance to which the trough is to be spread. As the belt 1 passes the rollers 53 the trough is spread and the belt 2 is inserted.

The feed hopper 4 is shown in detail in FIGURES 14–16. The lower end of the hopper has a reduced width to form a spout 55 which extends into the mouth of the trough 9 of the belt 1 to permit the fluent material stored in the hopper 4 to be continuously introduced into the belt 1 as it passes the feeding position. The depth of the feed may be precisely controlled by a horizontal lip 56 which extends from the downstream end of the bottom of the spout 55. The lip 56 is spaced above the bottom of the trough to the desired depth of material being conveyed. The rate of feed may be controlled by adjusting the height of the lip 56 above the trough bottom. The material is conveyed in the belt 1 without an insert belt throughout the horizontal portion of the path of travel of the conveyor. At the beginning of the inclined portion of the belt path the insert belt 2 is positioned in material conveying relation with the belt 1 and the material is carried to the top of its path of travel to a discharge position where it is deposited in the discharge hopper 5.

If desired, the direction of discharge may be controlled by a device, as shown in FIGURE 20. In this device the belts 1 and 2 in upright condition pass over the top of a wheel 61 around which the belt 1 continues in the opposite direction. The belt 2, however, is carried around a sheave 62 and a guide roller 63 for return in the opposite direction. The material carried between the belts 1 and 2 is thrown outwardly at the point where the belts 1 and 2 diverge at 64. The sheave is rotatably mounted on the end of an arm 65 the inner end of which is pivotally connected to the axle 66 at the center of wheel 61. The arm 65 can be rotated about the axle 66 and fixed at any of a variety of angular positions which are exemplified by the two positions shown in solid and phantom lines in FIGURE 20. Thus, the point of divergence 64 of the belts 1 and 2 may be varied around the periphery of the wheel 61 to change the direction of discharge of the material being conveyed. To compensate for the adjustment in position of the sheave 62, the wheel 63 is mounted on an axle 67 which may be moved longitudinally and fixed at any of a plurality of positions along a slot 68 in a bar 69. Typical relative positions of the wheel 63 with respect to the wheel 62 are shown in solid and phantom lines in FIGURE 20.

An alternative conveyor system is illustrated in FIGURES 17–19 to show the use of the conveyor belts according to the invention as an elevator for particulate material. In this system the belt 1 travels vertically between a pair of pulley wheels 71 and 72. The insert belt 2 is employed only during one of the two vertical runs of the belt 1. Specifically, the insert belt moves around a sheave 73 at the bottom of one vertical run of the belt 1 and is inserted into the trough of the belt 1 for travel around the wheel 72 and up the opposite vertical run and around a portion of the wheel 71 where it is removed from the trough for travel around the sheave 74 and around a path, separate from that of the belt 1, back to the sheave 73.

Power to drive the belts 1 and 2 is applied to one or more of the pulleys such as by an electric motor 75 drivingly connected to a pulley 76. The direction of travel of the belts and pulleys is shown by the arrows in FIGURE 17.

The material is fed into the trough of the belt 1 at the bottom of the downward vertical run from a nozzle 77 which depends from a hopper 78. The nozzle 77 is adjustable by means of a screw 79 and a threaded wheel 80 for movement relative to the belt 1 into a position to provide a throat 81 between the lower lip of the nozzle and the bottom of the trough of sufficient dimensions to admit a supply of material to be conveyed at a rate appropriate to prevent accumulation of the material in the hopper 78. The width of the throat 81 may be varied to control the rate of delivery of material into the trough. The bottom of the nozzle 77 extends into the nip of the belts 1 and 2 as they approach each other to prevent material from being spilled outwardly around the approaching belt 2. The nozzle 77 may be sufficiently wide to spread the mouth of the trough as shown in FIGURE 18 to facilitate insertion of the belt 2 into the trough of the belt 1 as previously described. Alternatively, the trough may be spread by other means such as those described hereinbefore.

Various pulley configurations may be employed to direct the travel of the belts 1 and 2. As shown, for example, in FIGURE 6, all of the pulley configurations include a channel 82 to receive the belt 1. Preferably a second channel 83 is formed in the center of the bottom of channel 82. The channel 83 conforms generally to the configuration of the insert belt 2. Thus, the same pulley may be employed to guide either the belt 1 or the belt 2. Moreover, as illustrated in FIGURE 10, the combination of the channels 82 and 83 may be advantageously employed to guide the assembled belts 1 and 2 where the top of the trough and the belt 2 face the pulley.

As illustrated in FIGURE 21, the smaller channel for the belt 2 need not be round but may be polygonal, as shown at 84.

Figure 23:
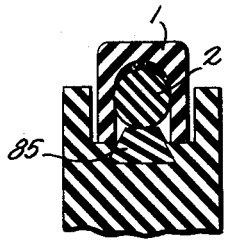
FIGURE 23 is a view similar to FIGURE 22 showing the same pulley guiding the assembled belts in inverted position.

Illustrated in FIGURES 22 and 23 is another form of pulley configuration wherein an annular trapezoidal insert 85 is mounted at the base of the channel 82 to protrude above the bottom of the channel 82. Such trapezoidal insert 85 may be employed as a belt spreader as shown in FIGURE 22. Alternatively, the trapezoidal insert 85 may be employed to firmly press the belt 2 toward the bottom of the trough of the belt 1 when the assembled belts are passed around the pulley with the open end of the trough facing the pulley, as illustrated in FIGURE 23.

Manifestly, the belts 1 and 2 may be employed for many different conveying jobs. In assembled relation, they may transport fluent material horizontally, uphill or downhill and in straight or curved paths. Substantially horizontal conveying runs may be made without the insert belt. In some instances it may be desirable to guide the insert belt after removal to another position at which it will again be inserted rather than immediately returning the insert belt to its original position.

Where the belts are made of rubber or some other good heat insulating material, they are capable of transporting hot or cold fluent material over long distances with little loss or gain of heat.

Figure 25:
FIGURE 25 is a transverse sectional view of modified conveyor belts wherein the U-shaped belt is provided with longitudinal reinforcing wires and the insert belt is hollow.

Various modifications of the belt construction will now be described. One such modification is shown in FIGURE 25 and is comprised of a belt 101 which is identical to the belt 1 except that there is mounted in the sidewalls of the belt near the mouth of the trough a pair of reinforcing wires 103 extending the length of the belt. The insert belt 102, shown in FIGURE 25, is hollow instead of solid. If desired, the chamber 104 within the belt 102 may be filled with a compressed gas such as air to any desired pressure to achieve the desired resilience.

Figure 26:
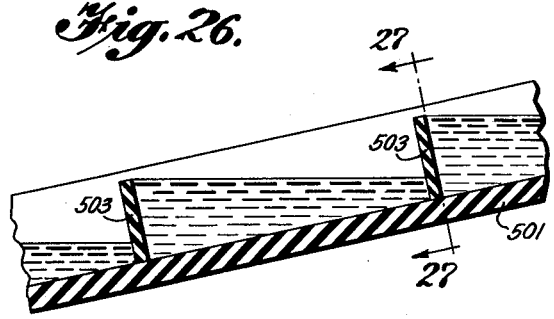
FIGURE 26 is a modified U-shaped belt utilized without an insert belt and embodying spaced transverse partitions for use on horizontal runs or slight inclines.
Figure 27:
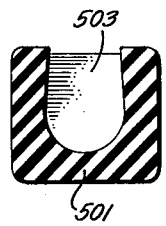
FIGURE 27 is a section taken along the lines 27—27 of FIGURE 26.

Another modified form of belt particularly adapted for horizontal or slightly inclined runs is shown in FIGURES 26 and 27. In this embodiment a belt 501 is identical to the belt 1 except that there is incorporated into the trough of the belt a plurality of spaced transverse partitions 503 which close the trough and extend nearly to the top of the sides of the belt. Such partitions prevent material being conveyed from falling by gravity longitudinally along the belt during inclined runs. It will be noted that this embodiment is not suited to steeply inclined runs where an insert belt is desirable.

Figure 28:
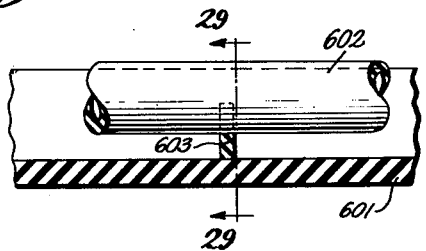
FIGURE 28 is a longitudinal section of a further modified conveyor belt to convey liquids or slurries or very fine dry particles that tend to flood wherein the U-shaped belt is provided with shallow partitions in the lower portion of its trough and the insert belt rests on the tops of the partitions.
Figure 29:
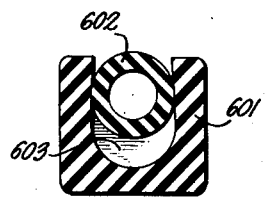
FIGURE 29 is a vertical section taken along the lines 29—29 of FIGURE 28.

A further embodiment particularly adapted to transport the liquids or slurries or very fine dry particles that tend to flood is shown in FIGURES 28 and 29. In this embodiment a belt 601 is identical to the belt 1 except that in the former a plurality of shallow partitions 603 are provided at longitudinal spaced locations in the belt 601. An insert belt 602 which may be hollow and filled with gas is identical in its function in relation to the belt 601 as the belt 2 in relation to the belt 1. The partitions 603 extend upwardly only a short distance above the bottom of the trough 601 and the tops of the partitions have configurations conforming to those of the bottom of the insert belt 602. Where the bottoms of the belt 602 and the trough of the belt 601 are arcuate, the partitions 603 are crescent shaped. Thus, when the belt 602 is inserted in the trough of the belt 601 the former is held firmly against the tops of the partitions 603 by the pressure of the sides of the trough. A liquid material or slurry being conveyed is deposited in the trough of the belt 601 prior to the insertion of the insert belt 602. The level of the liquid or slurry is controlled so that the insert belt 602 may be inserted in the trough resting against the tops of the partitions 603 and the liquid or slurry will be completely contained below the tops of the partitions within the space between the bottom of the trough and the bottom of the belt 602. The assembled belts 601 and 602 may be passed along any straight or curved path horizontally, vertically or inclined and the liquid or slurry is securely retained in the trough. The partitions 603 seal against the bottom of the insert belt 602 to prevent longitudinal flow of the liquid or slurry. It will be recognized that the assembled belts 601 and 602 may be utilized to convey solid fluent materials but are particularly advantageous with respect to liquids and slurries and very fine dry particles.

Figure 30:
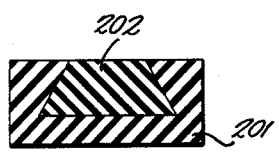
FIGURE 30 is a sectional view of a further modified form of conveyor belt assembly.
Figure 31:
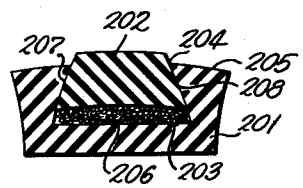
FIGURE 31 is a view similar to FIGURE 30 with the U-shaped belt and belt insert in material conveying relation.

In the modification shown in FIGURES 30 and 31 a belt 202 corresponds to the belt 2 but is of generally rectangular cross section with a trapezoidal trough 203 formed therein opening at 204 along face 205 of the belt. The trough 203 is defined by a flat-bottom wall 206 and sidewalls 207 and 208 extending inwardly inclined relation from the bottom wall 206 toward the mouth 204 of the trough. The belt 201 conforms in function to the belt 1 as previously described. A trapezoidal insert belt 202 is employed with the belt 201 in order to substantially completely close against the bottom of the trough when very small quantities of material are being conveyed. As in the previously described embodiments the insert belt 202 is inserted into the trough of the belt 201 after material is deposited into the trough. The resilience of the belt 201 causes the walls 207 and 208 to engage the sides of the insert belt 202 urging it inwardly toward the trough bottom and in firm engagement with the material being conveyed, as shown in FIGURE 31.

Figure 32:
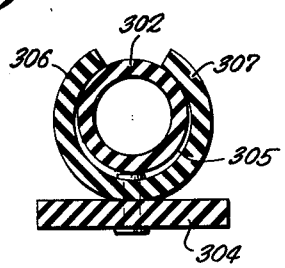
FIGURE 32 is a sectional view of yet another modified form of conveyor belt assembly.
Figure 33:
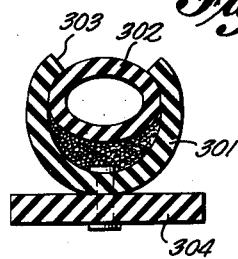
FIGURE 33 is a view similar to FIGURE 32 showing the U-shaped belt and insert belt in material conveying relation.

In another embodiment, shown in FIGURES 32 and 33, a troughed belt 301 is approximately cylindrical, having an opening at the top thereof at 303. The belt 301, if desired, may be connected as by rivets to an auxiliary flat belt 304 to prevent rotation of the belt 301 about its axis. Where the belt 301 is adequately held in position by other means, the belt 304 may be omitted. The belt 301 has a trough 305 which is generally cylindrical with inwardly inclined sidewalls 306 and 307 extending from the trough bottom toward the opening 303. Cooperating with the troughed belt 301 and retained therein and urged toward the bottom of the trough by the inwardly inclined sidewalls 306 and 307 is an insert belt 302 which preferably is normally cylindrical and hollow. Preferably each of the belts 301 and 302 is resilient. Thus the insert belt 302 tends to deform into an oval shape when urged by the inclined walls 306 and 307 into contact with material being conveyed in the bottom of the trough of the belt 301. The belt 302 may be filled with air or other gas to a desired pressure to achieve the desired resilience.

A still further modified belt arrangement and a portion of a conveyor system embodying such belt arrangement are shown in FIGURES 34, 35 and 36. In this embodiment a troughed belt 401 providing the material supporting surface is arranged to receive material to be conveyed and cooperating insert belt 402 providing the material pressing surface is arranged to engage the camming surface provided by inwardly inclined or sloping portion of wall 403 as shown in FIGURE 35 to pinch the material being conveyed against the internal wall 403 of trough 404 of belt 401. Belt 402 in this modification preferably is softly resilient and comprises a soft rubber tube containing air under pressure slightly above atmospheric pressure. Belt 402 is disposed within the trough and if desired may be attached such as at 405 to the wall of the trough as by adhesive bonding or vulcanizing.

Trough 404 may be loaded through a suitable nozzle 406, as shown in FIGURES 34 and 36, with the nozzle entering belt opening 407 and extending between tube 402 and trough wall 403. Wear is reduced if rollers 403, 409, and 410 are inserted into the trough adjacent the nozzle and arranged to compress tube 402 against trough wall 403 and to expand the belt trough opening 407. Suitable means are, of course, provided to support the rotatable rollers, such as support member 411 mounting roller 408.

The belts 401 and 402 are adapted to raise materials, or to convey materials in any direction, vertically, horizontally or inclinedly, in systems generally in accord with FIGURES 1 or 17. The nature of belts 401 and 402, and the manner in which they cooperate, however, make it preferable to load the trough with the belt opening directed to one side, as shown in FIGURES 34 and 36, whereby the materials deposited in the trough are disposed against trough sidewall 403. Unloading of the trough may be accomplished by providing belt deforming guides such as rollers 408, 409, 410 at the area of discharge with the belt inverted to permit the contents to fall by the force of gravity or to be ejected by inertia as in FIGURE 17. If belt 402 is attached in trough 404 or if it is not desired to remove belt 402 at the discharge station but to deflect and deform belt 402 to permit discharge, the side loading suggested above, and as shown in FIGURES 34, 35 and 36, will minimize any tendency of particles or objects to be held by portions 412 of the deformed belt against the wall 413 opposite the opening of trough 404.

Following loading, the belts 401 and 402 move along as indicated by arrow 414 with the inner belt or tube 402 expanded to fill the trough and pinch and retain the materials being conveyed in fixed position in the trough.

The belts extend over suitable pulleys to an unloading station and thence back for reloading to nozzle 406 as in FIGURES 1 or 17, except that belt 402 returns in belt 401 rather than along some separate path.

Belt 401 is seen to resemble belt 1, except that in the former the trough walls 403 and 405 are somewhat rounded rather than flat. Belt 402 is similar to belt 2 described above, but should be more readily deformable to occupy only a small percentage of the volume of the trough. A pneumatic or air filled soft rubber tube is preferred for belt 402.

With any of the modifications described, the materials being conveyed are held in place regardless of variations in the quantities of materials held in the belt and do not move longitudinally due to gravity along the trough during inclined or vertical runs and are not thrown outwardly by centrifugal force while negotiating curves. It is apparent that many different fluent materials may be conveyed.

In loading abrasive granular particles into the troughed belt, it has been found that frictional wear of the belts is minimized by feeding the particles into the trough at the approximate speed of the belt. While the systems of FIGURES 1 and 17 contemplate inertial or centrifugal unloading, the load may be mechanically lifted or scooped out of the trough at the delivery station after the insert belt has been removed, or the U-shaped belt may be inverted to dump material from the trough by gravity.

While the invention has been described with respect to certain preferred specific embodiments, various other modifications may be made by persons skilled in the art without departing from the scope of the invention which is defined solely by the appended claims.

This is a continuation in part of my pending application Serial No. 768,884, filed October 23, 1958, now abandoned.

I claim:

1. In a lifting conveyor, a continuous pliable resilient belt having a trough extending throughout its length, said trough being defined by a generally semicylindrical bottom wall and a pair of spaced side walls meeting said bottom wall and extending therefrom with gradually decreasing separation between said side walls, the outer edges of said side walls defining an opening into said trough of less width than the trough bottom, said belt being resiliently deformable to increase the width of said opening to be substantially equal to the width of the trough bottom, and a second continuous pliable belt of generally circular cross section having a diameter substantially equal to the maximum width dimension of said trough receivable into and removable from said trough, means for inserting said second belt into said trough, said side walls engaging generally opposite portions of said second belt to retain said second belt in said trough and continuously urge said second belt toward material supporting contact with said bottom wall when said second belt is inserted in said trough.

2. In a belt conveyor, a first pliable conveyor belt means formed with a continuous longitudinal trough therein, said trough providing a material supporting surface, said trough having one wall sloping inwardly and toward the center of said trough to provide a camming surface, a second pliable belt means providing a material pressing surface and a portion engaged with said camming surface during conveying of material pressed between said pressing and supporting surfaces, at least one of said belt means being resilient, means for locating said second belt means in said trough to engage said camming surface with said portion of said second belt means, said inwardly sloping camming surface cooperating with said portion of said second belt means to continuously urge said pressing surface toward material supporting contact with said supporting surface during conveying of material.

3. In a belt conveyor as recited in claim 2 wherein said means for locating said second belt means in said trough comprises attachment of said second belt means to said first belt means.

4. In a belt conveyor, a first pliable belt formed with a continuous longitudinal trough therein, said trough providing a material supporting surface, said trough having one wall sloping inwardly and toward the center of said trough to provide a camming surface, a second pliable belt insertable into and removable from said trough, said second belt having a wall providing a material pressing surface extending therealong and a portion engageable with said camming surface, at least one of said belts being resilient, means for inserting said second belt into said trough to engage said camming surface with said portion of said second pliable belt, said inwardly sloping camming surface cooperating with said portion of said second belt to retain said second belt in said trough and continuously urge said pressing surface toward material supporting contact with said supporting surface when said second belt is inserted into said trough.

5. In a belt conveyor, a first pliable belt formed with a continuous longitudinal trough therein, said trough providing a material supporting surface, said trough having walls along opposite sides of said material supporting surface, said walls sloping inwardly and toward the center of said trough to provide camming surfaces facing inwardly of said trough, a second pliable belt insertable into and removable from said trough, said second belt providing a material pressing surface extending therealong and portions extending along said second belt at opposite sides of said material pressing surface, at least one of said belts being resilient, means for inserting said second belt into said trough to respectively engage said camming surfaces with said portions of said second belt, said inwardly sloping camming surfaces cooperating with said portions respectively to retain said second belt in said trough and continuously urge said pressing surface toward material supporting contact with said support surface when said second belt is inserted in said trough.

6. In a belt conveyor for a fluent material the combination comprising first and second belt means of highly flexible and resilient rubbery material, said first belt means having continuous bottom and side walls impervious to the fluent material and defining a continuous longitudinal trough, said second belt means being slightly wider than the outer portion of said trough and movable inwardly in said trough in frictional gripping relation between said side walls to press the fluent material between the bottom of said second belt means and the bottom of said trough, the resilience of said first and second rubbery belt means permitting them to be mutually flexed both horizontally and vertically with said second belt means in said trough.

7. An apparatus for conveying material which comprises first and second belt means, each of said belt means being horizontally and vertically flexible, said first belt means having continuous bottom and side walls impervious to the material being conveyed and defining a continuous longitudinal trough to receive the material, said side walls being spaced apart a distance slightly less than the width of said second belt means, at least one of said belt means being resiliently deformable to permit forced insertion of said second belt means into said trough in frictional engagement with said side walls thereby retaining said second belt means in said trough, said first and second belt means defining therebetween in said trough inwardly of said frictional engagement a material conveying chamber, said second belt means being movable in said trough to vary the size of said chamber to positively grip the material between said first and second belt means.

8. An apparatus as recited in claim 7 wherein said first belt means is formed of rubbery material.

9. An apparatus as recited in claim 7 wherein the lower portion of said trough contains spaced lateral partitions conforming to the bottom of said second belt means.

10. An apparatus as recited in claim 7 wherein said first and second belt means are formed of rubbery material.

11. An apparatus for conveying material which comprises first and second belt means, each of said belt means being horizontally and vertically flexible, said first belt means having continuous bottom and side walls impervious to the material being conveyed and defining a continuous longitudinal trough to receive the material, said side walls being spaced apart a distance slightly less than the width of said second belt means, at least one of said belt means being resiliently deformable to permit forced insertion of said second belt means into said trough in frictional engagement with said side walls thereby retaining said second belt means in said trough, said first and second belt means defining therebetween in said trough inwardly of said frictional engagement a material conveying chamber, said second belt means being movable in said trough to vary the size of said chamber to positively grip the material between said first and second belt means, means supporting said first and second belt means for movement around first and second endless paths which have mutually coinciding and separated portions, and means to feed material to be conveyed into said trough ahead of said coinciding portion, said second belt means being moved into said trough along said coinciding portion to press the material against the trough bottom, said belt means having a discharge station behind said coinciding portion.

12. An apparatus as recited in claim 11 wherein said first belt means is resilient and further comprising means to spread the outer ends of said trough to facilitate insertion of said second belt means at the beginning of said coinciding portion.

13. An apparatus as recited in claim 11 wherein said supporting means includes opposed rollers at said discharge station which is located at the end of said coinciding portion to cause said first and second belt means to diverge around said rollers to discharge the material from therebetween and means to vary the inclination of the line between the axes of said opposed rollers to change the direction of said discharge.

14. An apparatus as recited in claim 11 wherein said supporting means is demountable and comprises a pair of end sleeves and means telescopically and removably connecting said end sleeves, each of said end sleeves carrying an end pulley to reverse the direction of travel of said first belt means, one of said end sleeves having means connected thereto to move its pulley longitudinally of said first belt means to control the tension of said first belt means.

15. An apparatus as recited in claim 11 wherein said supporting means includes a plurality of pulleys to support and guide said first and second belt means, at least some of said pulleys providing a wide channel to receive said first belt means and a narrow channel in the base of said wide channel to receive said second belt means.

16. An apparatus as recited in claim 12 wherein said spreading means comprises roller means of substantially less width than said first belt means to apply pressure to the center of the exterior bottom of said first belt means.

17. An apparatus as recited in claim 16 wherein said roller means comprises a pulley providing a circumferential channel to receive said first belt means and an annular protrusion in the base of said channel to apply said pressure.

18. An apparatus as recited in claim 14 wherein said means connecting said end sections includes a bent intermediate sleeve and bars telescopically and removably connecting said end sleeves thereto, said intermediate sleeve carrying a pair of laterally spaced guide pulleys engaging oppositely moving runs of said first belt means and changing the direction of movement of said runs, one of said laterally spaced guide pulleys also engaging one end of said second belt means to reverse its direction of travel and insert it into said trough, one of said end sleeves also carrying a guide pulley to engage said second belt means removing it from said trough and reversing its direction of travel.

19. An apparatus for conveying fluent material which comprises a rubbery endless belt having a continuous bottom wall and a pair of laterally spaced continuous side walls impervious to the fluent material and defining a continuous longitudinal trough for containing the fluent material, said belt being horizontally and vertically flexible and substantially equal in width and depth with said bottom and side walls having a thick and resiliently rigid construction to self sustain the general configuration of said trough by resilient resistance to lateral flexing of said side walls, means supporting said belt for movement around an endless path including at least one horizontal curve, said supporting means including a plurality of horizontal rollers supporting the bottom of said belt, a plurality of upright horizontally disaligned rollers engaging the exterior face of one of said side walls inwardly of said curve, and means to retain said belt horizontally flexed around said upright rollers to cause the top of the outer side wall converge toward the roller engaging inner side wall.

References Cited in the file of this patent

UNITED STATES PATENTS

| 2,108,488 | Johns | Feb. 15, 1938 |
| 2,548,111 | Johns | Apr. 10, 1951 |

FOREIGN PATENTS

| 2,049 | Great Britain | Aug. 7, 1865 |
| 602,925 | France | Apr. 3, 1926 |